United States Patent [19]

Blanchet et al.

[11] Patent Number: 5,263,408
[45] Date of Patent: Nov. 23, 1993

[54] FOOD PRESS

[75] Inventors: Michel Blanchet; Daniel Mario, both of Vence - Alpes Maritimes, France

[73] Assignee: Somatic, Vence, France

[21] Appl. No.: 35,882

[22] Filed: Mar. 23, 1993

Related U.S. Application Data

[63] Continuation of Ser. No. 543,712, Jul. 12, 1990, abandoned.

[30] Foreign Application Priority Data

Jan. 14, 1988 [FR] France .................. 88 00367

[51] Int. Cl.⁵ .............. A23N 1/00; A47J 19/02; B30B 9/04
[52] U.S. Cl. .................... 99/495; 99/508; 100/125; 100/131; 100/271
[58] Field of Search ........... 99/495, 509, 510, 349, 99/508; 100/293, 125, 130, 110, 116, 131-135, 233, 270, 271, 272

[56] References Cited

U.S. PATENT DOCUMENTS

| | | | |
|---|---|---|---|
| 1,301,888 | 4/1919 | Walton et al. | 100/270 |
| 1,579,480 | 4/1926 | Hoover . | |
| 1,911,687 | 5/1933 | Hafley | 100/131 |
| 1,939,556 | 12/1933 | Kammer | 100/130 |
| 2,535,244 | 12/1950 | Van Voorhis et al. | 100/131 |
| 2,738,724 | 3/1956 | Johnson | 100/125 |
| 3,108,533 | 10/1963 | Read et al. . | |
| 3,797,382 | 3/1984 | Muzzi et al. | 100/293 |
| 4,004,480 | 1/1977 | McCabe | 100/272 |
| 4,080,860 | 3/1978 | McCabe | 100/272 |
| 4,083,205 | 4/1978 | Clarke et al. | 100/233 |
| 4,142,933 | 3/1979 | Graham | 100/116 |
| 4,165,629 | 3/1979 | McCabe . | |
| 4,219,427 | 8/1980 | McCabe . | |
| 4,453,455 | 6/1984 | Bergstrand | 100/270 |

FOREIGN PATENT DOCUMENTS

| | | |
|---|---|---|
| 1231861 | 7/1967 | Fed. Rep. of Germany . |
| 2754590 | 6/1979 | Fed. Rep. of Germany ...... 100/293 |
| 670955 | 12/1929 | France . |
| 1043471 | 6/1955 | France . |
| 1409335 | 7/1965 | France . |
| 1469241 | 2/1967 | France . |
| 2438539 | 5/1980 | France . |
| 2018170 | 10/1979 | United Kingdom . |

Primary Examiner—Timothy F. Simone
Attorney, Agent, or Firm—Browdy and Neimark

[57] ABSTRACT

Food press of the kind comprising pressing means adapted to operate on the food(s) to be pressed comprising at least one grid (12) and at least one plate (13) between which the food(s) (42) must be disposed, characterized in that hydraulic operating means (15) are associated with said pressing means and adapted to move the grid and the plate towards each other so that they exert pressure on the food(s), the hydraulic operating means (15) comprising at least one single-acting piston-and-cylinder actuator (24) operated by a hydraulic pump (25) adapted to operate in compression and in suction.

8 Claims, 2 Drawing Sheets

FOOD PRESS

This application is a continuation of application Ser. No. 07/543,712, filed Jul. 12, 1990, now abandoned.

BACKGROUND OF THE INVENTION

1. Field of the Invention

The present invention concerns a press for foods such as ice, fruit and vegetables.

2. Related Art

Presses for fruit and vegetables are known in the art. The "cone" type machines incorporate a fixed or mobile conical member over which the previously halved fruit is placed. The pressure applied to the fruit combined with rotation of the fruit or of the cone extracts the juice from the fruit. These machines are operated semi-automatically or automatically, the cone being rotated, or manually.

Although their operation is generally satisfactory, these machines have a number of inadequacies that the invention proposes to alleviate. These cone-type machines are limited to certain types of fruit, to be more precise they are limited to citrus fruit. What is more, where a relatively high throughput is required these machines are limited to a single type of citrus fruit (oranges or grapefruit, for example), and furthermore the fruit used must be of a certain size, and this increases the cost of the fruit juice. Nor is the throughput of these machines satisfactory, especially given that the demand for freshly squeezed fruit is on the increase and that large quantities, for example several hundred liters per hour, may be required from the press, for example in a large hotel at breakfast time.

Also known are centrifuge type machines in which pieces of fruit are centrifuged to extract the juice. These machines are characterised by a high noise level and a high price. As is also known, the quality of the fruit juice obtained is not so good because the centrifuged fruit juice is generally emulsioned, which spoils the taste. The construction of the machine is also somewhat complicated and as it must be cleaned relatively frequently, which is a time-consuming operation, the result is a relative loss in yield.

The present invention is directed to a press that is designed to enable fruit to be pressed with a high throughput, that is simple to use, that yields juice with a quality at least as good as cone-type machines, that is low in cost and that is suitable for private use as well as in large scale catering operations and drinks outlets.

The present invention is also directed to a press of significantly simpler construction than those briefly described above and which is much easier to use, especially in a bar or in a restaurant, and which offers a higher throughput than the prior art machines.

To this end the present invention is directed to a food press of the kind comprising pressing means adapted to operate on the food(s) to be pressed comprising at least one grid and at least one plate between which the food(s) must be placed, characterised in that hydraulic operating means are associated with said pressing means and adapted to move the grid and the plate towards each other so that they exert pressure on the food(s), the hydraulic operating means comprising at least one single-acting piston-and-cylinder actuator operated by a hydraulic pump adapted to operate in compression and in suction.

By virtue of these arrangements the food(s) are not centrifuged in the press and consequently the juice is not emulsioned and retains its natural taste. The cone of cone-type machines is dispensed with, enabling the machine in accordance with the invention to be used not only with citrus fruits but also with all sorts of fruits and vegetables, such as pineapples or tomatoes, for example.

It will therefore be noted that the machine in accordance with the invention can be used to press pineapples, the juice from this fruit being usually obtained in the prior art only by means of centrifuges so that it cannot be obtained by private persons or restaurateurs who do not own a centrifuge. What is more, the pressure required to press this kind of fruit is relatively high, which can only be achieved with difficulty in the prior art but which is rendered possible by the combination of means in accordance with the invention.

Similarly, the machine in accordance with the present invention can be used to crush ice, which is not so in the prior art presses described above, for the same reasons among others.

Another advantage of dispensing with the cone lies in the fact that the pulp is not torn out from the fruit but is rather crushed. As a result of this feature there is no need to clean the grid frequently whereas in a cone-type machine the detached pulp quickly blocks the filter associated with the machine.

The means employed are particularly simple since the hydraulic operating means essentially comprise one or more single-acting piston-and-cylinder actuators associated with a simple design pump.

These hydraulic means produce a high pressure for a low consumption of energy which not only improves the quality with which the fruit is pressed but also reduces the energy cost of the pressing operation. What is more, pressing can be carried out much more quickly with the device in accordance with the invention as the positioning of a fruit on a cone is avoided. With the press in accordance with the present invention it is sufficient to cut the fruit into two parts and to place the latter between the plate and the grid. The fruit pressing yield and throughput are thus increased, which is particularly benefical.

Note that the hydraulic means employed are particularly simple to implement and therefore relatively inexpensive.

The invention uses only one or more single-acting piston-and-cylinder actuators associated with a hydraulic pump able to operate in compression and in suction.

By virtue of these arrangements, when the pressing is completed the pump is reversed and the actuator returns to its idle position as a result of suction.

In a preferred embodiment this return movement is advantageously accelerated by a spring. This further increases the throughput of the press since it is ready to receive further foods within a few seconds of pressing the previous foods, the plate returning quickly to the open position.

In this preferred embodiment a pressure sensor is included in the hydraulic circuit and is associated with means for reversing the pump drive motor when a pressure threshold is reached.

These arrangements ensure that the press in accordance with the invention is safe to use and further facilitate its use since the machine is entirely automated. What is more, by choosing a sufficiently high pressure threshold particularly strong foods such as pineapples or ice can be pressed efficiently before the machine returns to the rest position.

The pump used is of simple construction since it operates in suction in the reverse direction: there is therefore no need in this case to provide means to enable the pump to operate in compression in both directions. In this way the present invention economises on a hydraulic pump operating in compression in both directions, double-acting actuators and a distributor.

It will likewise be noted that the machine in accordance with the present invention is particularly quiet in operation, which is not the case with prior art machines, centrifuges in particular.

In the preferred embodiment the grid is fixed and the plate is mobile.

To use the press it is therefore sufficient to place the foods on the grid, against which they are pressed by the plate. These arrangements are particularly simple and inexpensive to implement.

In this embodiment the plate is mounted on a first arm of at least one lever, the fulcrum of the latter being mounted to pivot about an axis, while the hydraulic means operate on the second arm of the lever.

By virtue of this arrangement it is possible in the known way to multiply the force of the hydraulic means and so to increase the pressure with minimum energy consumption.

The characteristics and advantages of the presention invention will emerge from the following description given with reference to the appended drawings in which:

DESCRIPTION OF THE PREFERRED EMBODIMENTS

Figure 1:
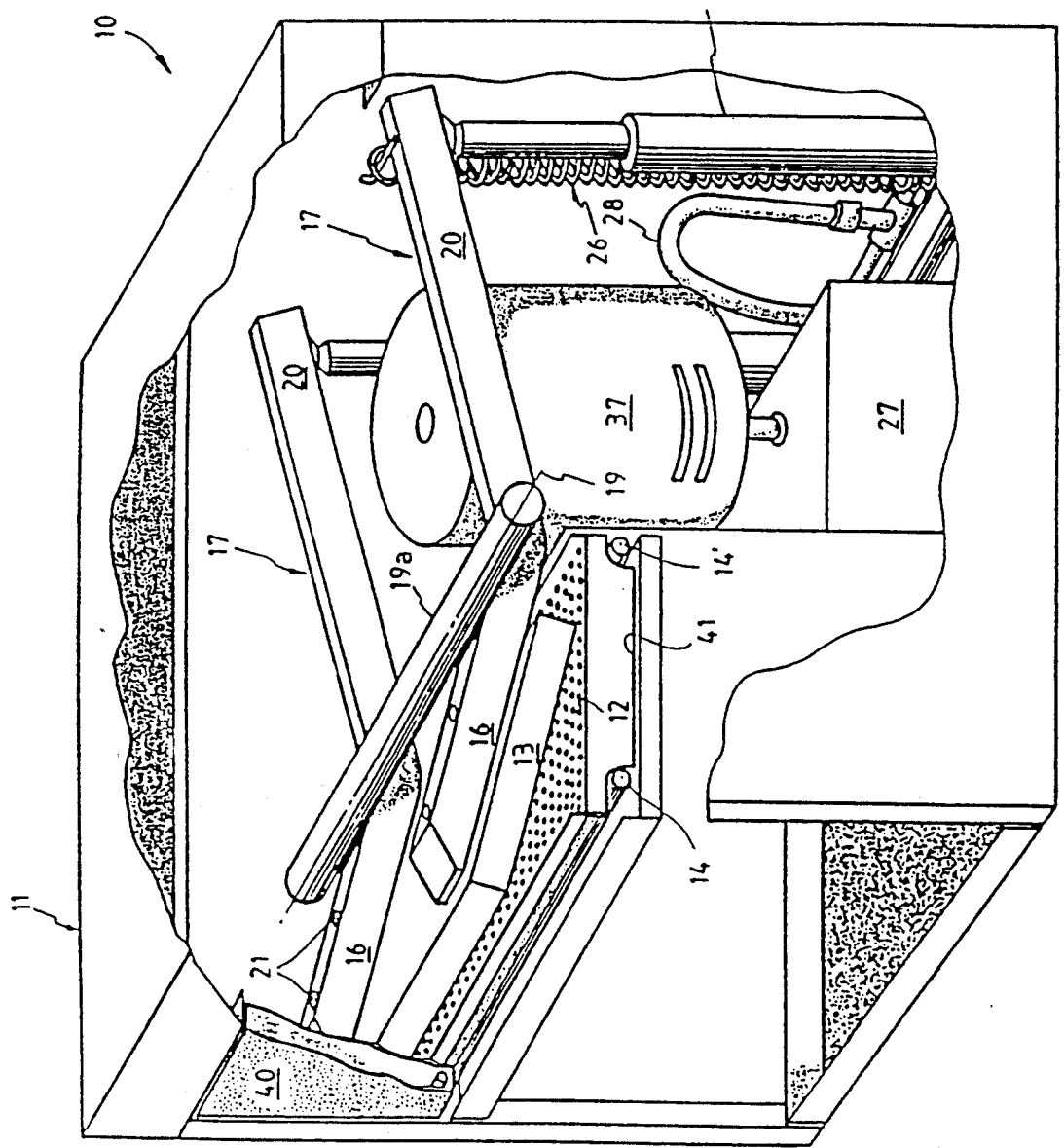
FIG. 1 is a partially cut away perspective view of one embodiment of a press in accordance with the invention.

In the selected embodiment shown in the figures a press 10 in accordance with the invention comprises a box forming a support structure 11 within which are disposed all of the working parts.

In accordance with the invention these means essentially comprise at least one grid 12 and at least one plate 13 between which the foods 42 are placed; hydraulic operating means 15 are associated with the pressing means constituted by the plate 13 and the grid 12.

In the selected embodiment shown there are only one plate and only one grid, the plate 13 being mounted on a first arm 16 of the lever 17 the fulcrum 18 of which is mounted to rotate about an axis 19. The hydraulic operating means 15 operate on the second arm 20 of the lever 17. Note (FIG. 1) that the plate 13 is mounted at each of its two ends on the first arm 16 of each of two levers 17. In the selected embodiment shown this mounting is achieved by means of screws 21. The fulcrum 18 is articulated by means of a rod 19a welded to said fulcrum 18 of each lever 17. This rod is articulated to the support structure 11 in a known manner, the articulation means having been omitted here to simplify the drawing.

In the selected embodiment shown the hydraulic operating means 15 comprise at least one piston-and-cylinder actuator 24, two such actuators being provided in this instance and each associated with one of the levers 17. Each of the actuators 24 is a single-acting actuator and the hydraulic operating means 15 further comprise a reversible pump 25, that is to say a pump that can operate in compression and in suction. In the embodiment shown a spring 26 is provided for returning the plate 13 to a rest position (that shown in FIG. 2), in which the plate is in a raised position.

Note (FIG. 2) that the hydraulic operating means also include a one liter oil storage tank 27 and oil pipes 28 connected to each actuator 24.

According to another characteristic of the invention the hydraulic operating means 15 further comprise a pressure sensor 33 and control means (50) associated with it for reversing the action of the hydraulic means, in this instance the direction of rotation of the motor 37 driving the pump 25, as soon as a pressure threshold (of 75 bars in this case) is reached.

In the press shown in the figures, in accordance with another characteristic of the invention, the grid 12 is removable. In this embodiment the grid 12 is mounted in a structure 41 adapted to rest on supporting crossmembers 14, 14' attached to the rest of the structure.

The supporting crossmembers 14, 14' are disposed above a receiving tray 29 having a substantially funnel-shape bottom 30 with an outlet orifice 31 at its center. The tray 29 is also removable, its mounting means having been omitted to make the figure easier to understand.

A hatch 40, part of which can be seen in FIG. 1, is provided in the front panel to avoid any possibility of accident.

Figure 2:
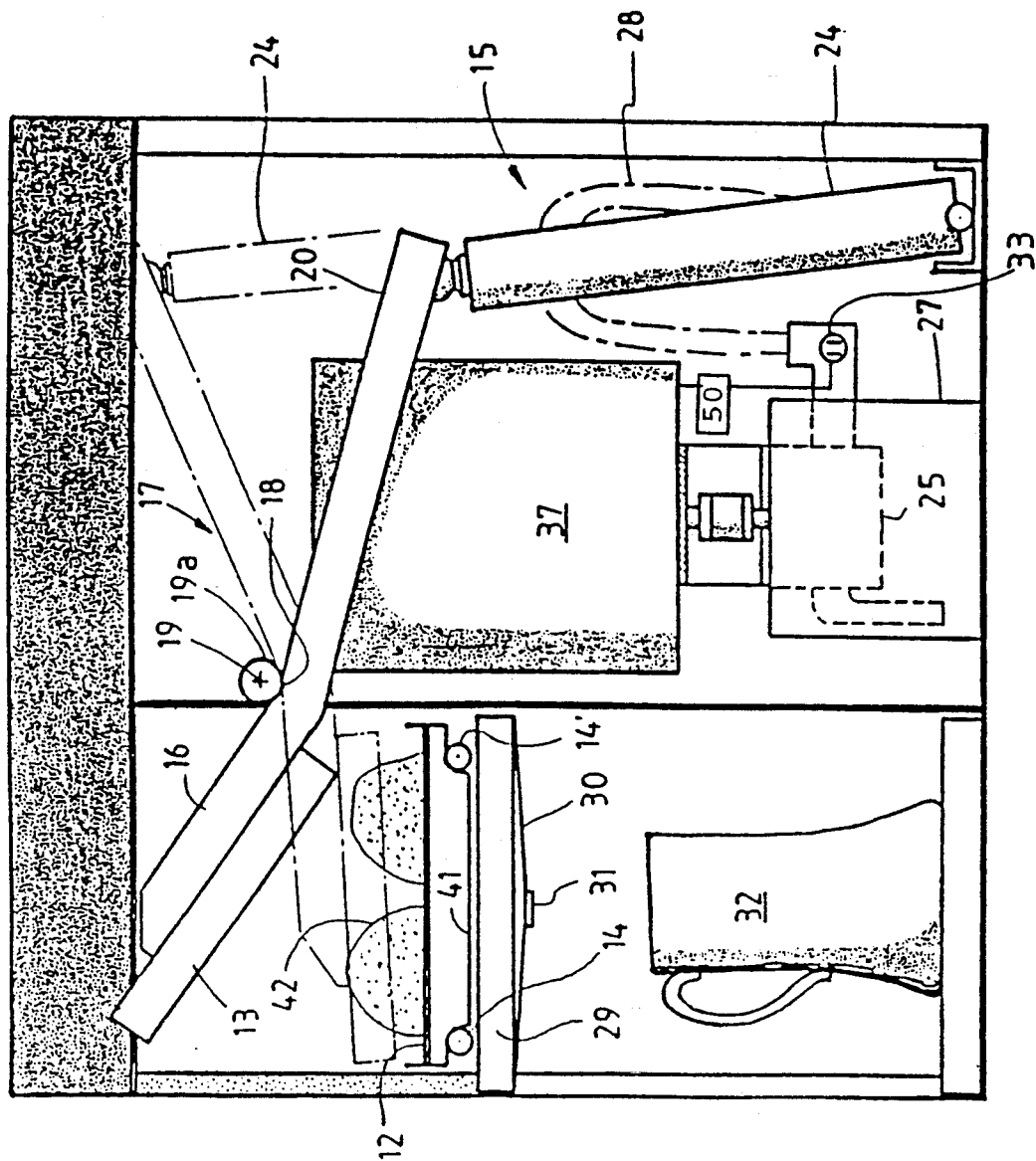
FIG. 2 is a schematic view in cross-section of the press in side elevation.

Operation is as follows:

The foods 42 are placed on the grid 12. In the case of citrus fruit, the fruit is cut into two parts as schematically shown in FIG. 2 and placed with the pulp in contact with the grid. As soon as the food is placed on the grid a safety switch (not shown) is operated. This safety switch is also operated by closing the door 40 on the front panel of the machine.

As soon as a start switch is operated (by a pushbutton that is not shown) the pump 25 is energised and the actuators 24 are operated. The actuators 24 push up the ends of the second lever arms 20 of each lever 17, as shown in chain-dotted outline in FIG. 2. The plate 13 is therefore lowered and presses the foods 14 as shown in this figure. FIG. 1 also shows, in full outline, the plate 13 in its lowered position.

The fruit juice flows through perforations in the grid 12. It is collected in the tray 29 and flows through the orifice 31. Means are provided for collecting the fruit juice as it leaves the orifice 31. In FIG. 2 these means are schematically represented by a jug 32.

The press in accordance with the invention may be used to crush ice. To this end ice cubes are placed on the grid and crushed onto the latter by the plate 13.

In the embodiment shown the perforations in the grid are circular with a small diameter (2 mm) and the crushed ice does not pass through the grid 12 but is recovered from its upper surface.

It is possible to provide a grid having the same appearance as the grid 12 but in which the holes have a larger diameter (5 to 8 mm, for example), these holes possibly comprising a cutting edge to crush the ice more effectively. In this case, as with fruit, the crushed ice passes through the grid and is recovered in the tray 29.

The pressure in the hydraulic circuit comprising the storage tank 27, the reversible pump 25, the pipes 28 and the actuators 24 is measured by the pressure sensor 33.

As soon as a nominal pressure (75 bars in this instance) is reached the pump 25 is reversed and the plate returned to the raised position as shown in full outline in FIG. 2. The pressed foods can therefore be removed and replaced with further foods.

Note that in the final phase of pressing with the hydraulic actuators 24 pressurised the latter function as hydraulic pressure accumulators and therefore contribute to returning the fluid to the pump, the latter temporarily functioning as a receiver when the electrical polarity is reversed. This characteristic favours the reversing of the motor driving the pump 25. During the return of the plate to the rest position the pump operates as a suction pump.

By virtue of this arrangement it is possible to use as the drive motor for the pump a single-phase electric motor 37 in which, as those skilled in the art will know, it is difficult to reverse the direction of rotation simultaneously with reversing the electrical polarity. This avoids the need for a three-phase motor that is normally more expensive to acquire and to operate.

In the selected embodiment shown the total time from starting the pump to perform the pressing, through the pressing itself to returning the plate to the rest position is in the order of five seconds. Users will appreciate the time saving in pressing fruit such as grapefruit or pineapple and in crushing ice.

In the selected embodiment shown each of the actuators 24 has a total diameter of 20 mm. The return spring 26, which is associated with only one of the actuators in the selected embodiment shown, decreases the time to return the plate 13 to its rest position, this return being achieved by reversing the pump 25, which creates a suction effect within the actuator cylinder 24.

The machine is 40 cm high by 26 cm wide in the selected embodiment shown, enabling two half-grapefruit or one half-pineapple of normal size to be placed on the grid for pressing.

Of course, the present invention is in no way limited to the selected embodiment shown but to the contrary encompasses any variant execution thereof.

We claim:

1. Food press of the kind comprising pressing means adapted to operate on the food(s) to be pressed comprising at least one grid and at least one plate between which the food(s) must be disposed, wherein hydraulic operating means are arranged for moving the grid and the plate towards each other so that they exert pressure on the food(s) and for moving the grid and the plate away from each other after they exert pressure on the food(s), the hydraulic operating means comprising at least one single-acting piston-and-cylinder actuator operated by a hydraulic pump operating in compression to create pressure on the food(s) and in suction after exerting pressure on the food(s) and moving the grid and the plate away from each other, whereas the plate is disposed on a first arm of at least one lever and a fulcrum of the lever is mounted to rotate about an axis and the hydraulic operating means operate on a second arm of the lever.

2. Press according to claim 1 comprising, associated with said actuator, at least one spring for returning the plate to a "rest" position.

3. Press according to claim 1 wherein the hydraulic operating means comprise a pressure sensor and control means associated with the sensor for reversing the pump driving the single-acting actuator immediately when a pressure threshold is reached.

4. Press according to claim 1 wherein the grid is fixed and the plate is mobile.

5. Press according to claim 1 wherein the grid is removable.

6. Press according to claim 1 wherein the grid comprises a plurality of perforations.

7. Press according to claim 6 wherein each of the perforations has a cutting edge.

8. Press according to claim 1 wherein the pump incorporates a single-phase electric motor.

* * * * *